United States Patent [19]

Tsuda et al.

[11] Patent Number: 5,077,373
[45] Date of Patent: Dec. 31, 1991

[54] POLYURETHANE, PROCESS FOR ITS PRODUCTION AND POLYESTER DIOL USED FOR ITS PRODUCTION

[75] Inventors: Tomoyasu Tsuda; Yukiatsu Komiya; Koji Hirai, all of Kurashiki, Japan

[73] Assignee: Kuraray Co., Ltd., Kurashiki, Japan

[21] Appl. No.: 515,422

[22] Filed: Apr. 27, 1990

[30] Foreign Application Priority Data

Apr. 30, 1989 [JP] Japan .................................. 1-112553
Sep. 29, 1989 [JP] Japan .................................. 1-255971

[51] Int. Cl.$^5$ ....................... C08G 18/30; C08G 18/42
[52] U.S. Cl. ..................................... 528/83; 521/172; 521/173
[58] Field of Search ................... 521/172, 173; 528/83

[56] References Cited

U.S. PATENT DOCUMENTS

| | | | |
|---|---|---|---|
| 4,362,825 | 12/1982 | Grabhoefer | 521/172 |
| 4,590,219 | 5/1986 | Nissen et al. | 521/172 |
| 4,639,471 | 1/1987 | Hirai et al. | 521/172 |
| 4,704,445 | 11/1987 | Komiya et al. | 528/49 |

FOREIGN PATENT DOCUMENTS

| | | |
|---|---|---|
| 0194452 | 9/1986 | European Pat. Off. . |
| 0299068 | 1/1989 | European Pat. Off. . |
| 978307 | 9/1964 | France .................. 521/172 |
| 0271788 | 6/1988 | United Kingdom ........ 521/172 |

*Primary Examiner*—John Kight, III
*Assistant Examiner*—T. Mosley
*Attorney, Agent, or Firm*—Oblon, Spivak, McClelland, Maier & Neustadt

[57] ABSTRACT

Provided are a polyurethane comprising (A) a structural unit derived from polyester diol, which consists essentially of 1 to 3 members selected from the structural units (I), (II) and (III) shown below, and the structural units (IV) and (V) shown below, the molar fractions of these structural units satisfying specific relationships:

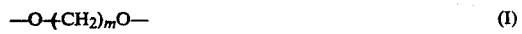

$$—O\text{-}(CH_2)_mO— \qquad (I)$$

wherein m represents an integer of 8 to 10

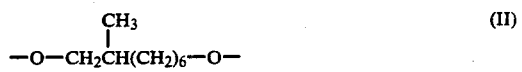

$$\begin{array}{c} CH_3 \\ | \\ —O—CH_2CH(CH_2)_6—O— \end{array} \qquad (II)$$

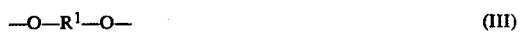

$$—O—R^1—O— \qquad (III)$$

wherein $R^1$ represents a branched primary glycol residue having 4 to 8 carbon atoms

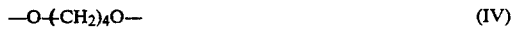

$$—O\text{-}(CH_2)_4O— \qquad (IV)$$

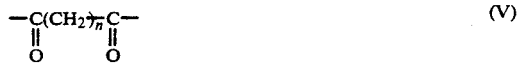

$$—\underset{\underset{O}{\|}}{C}(CH_2)_n\underset{\underset{O}{\|}}{C}— \qquad (V)$$

wherein n represents an integer of 4 to 8, and (B) a structural unit derived from a diisocyanate; a process for producing the same; and the polyester diol used for the preparation of the same.

13 Claims, No Drawings

POLYURETHANE, PROCESS FOR ITS PRODUCTION AND POLYESTER DIOL USED FOR ITS PRODUCTION

BACKGROUND OF THE INVENTION

1. Field of the Invention

The present invention relates to a novel polyurethane, to a process for its production and also to a polyester diol used for its production.

2. Description of the Related Art

Polyurethanes have various features such as high elasticity, high abrasion resistance, high resistance to oil and the like, and have hence caught much attention as substitutes for rubber and plastics. Thus, polyurethanes have widely and in large amounts been used as molding materials which are moldable by conventional plastic molding processes. Polyurethanes are produced by mixing and polymerizing a high polymer diol, a diisocyanate and a chain extender such as 1,4-butanediol. It is known to be preferable to melt starting materials, and mix and polymerize them.

Known polyurethanes are classified into polyester-, polyether- and polycarbonate-based ones, and they are used for various items according to their specific features. For instance, polyether-based polyurethanes are used in fields where resistance to hydrolysis is particularly required; polyester-based ones in fields where high mechanical properties and resistances to oil and abrasion are particularly required; and polycarbonate-based ones in fields where high durability is required in addition to the requirements as satisfied by polyester-based polyurethanes.

Among polyester-based polyurethanes, poly(butyleneadipate)-based ones, poly(hexamethyleneadipate)-based ones and the like are widely used because of their availability and, in general, relatively high performances. However, these widely used polyester-based polyurethanes often do not satisfy requirements from processability and from finished product properties, since they have low resistances to heat, water and cold and have some problems in injection moldability such as long cycle time, which cause productivity to decrease, generation of sink marks and the like. There have therefore been strongly desired improvements for the above drawbacks.

As polyester-based polyurethanes improved in resistances to water and cold, European Patent Application Publication No. 194452 and U.S. Pat. No. 4,639,471 disclose one prepared from, as the high polymer diol, a polyester diol obtainable by reacting 1,9-nonanediol, a specific diol having a methyl branch, such as 3-methyl-1,5-pentanediol, 2-methyl-1,3-propanediol or neopentyl glycol and a dicarboxylic acid. For the same purpose European Patent Application publication No. 299068 discloses one obtainable by utilizing as the high polymer polyol a polyester polyol obtained by reacting 2-methyl-1,8-octanediol or its mixture with a linear alkylene glycol having 6 to 9 carbon atoms with a dicarboxylic acid. The above European Patent Application publication No. 194452 and U.S. Pat. No 4,639,471 describe that ethylene glycol, propylene glycol or 1,4-butanediol can, in the production of the polyester polyol, be added to a mixture of 1,9-nonanediol and a diol having a methyl branch, provided that the amount added does not exceeds 5% by weight based on the weight of the mixture. Further the above European Patent Application Publication No. 299068 describes that a great decrease in resistance to hydrolysis and flexibility at low temperatures is observed in polyester-based polyurethanes produced by utilizing a polyester polyol obtained by reacting a dicarboxylic acid with a diol having not more than 5 carbon atoms, instead of the linear alkylene glycol having 6 to 9 carbon atoms, together with 2-methyl-1,8-octanediol. The present inventors have found that the above-proposed two types of polyester-based polyurethanes having improved resistances to water and cold often show a markedly improved injection moldability but are still of not sufficiently improved heat resistance.

SUMMARY OF THE INVENTION

An object of the present invention is to provide a high-performance polyester-based polyurethane having high heat resistance and injection moldability as well as being excellent in resistances to water and cold and in mechanical properties.

Another object of the present invention is to provide a process for producing the above-mentioned high-performance polyester-based polyurethane.

Still another object of the present invention is to provide a polyester diol capable of giving the above-mentioned high-performance polyester-based polyurethane.

The present invention provides a polyurethane having a main chain consisting essentially of a polyester diol unit and the structural unit (VII) shown below, said polyester diol unit consisting essentially of 1 to 3 members selected from the structural units (I), (II) and (III) shown below, and the structural units (IV) and (V) shown below, the sum of the molar fractions of structural units (I), (II), (III) and (IV) being substantially equal to the molar fraction of structural unit (V), the sum of the molar fractions of structural units (I) and (II) being at least 10% the sum of the molar fractions of structural units (I), (II), (III) and (IV), the sum of the molar fractions of structural units (II) and (III) being at least 10% the sum of the molar fractions of structural units (I), (II), (III) and (IV), and the molar fraction of structural unit (IV) being at least 30% the sum of the molar fractions of structural units (I), (II), (III) and (IV):

wherein m represents an integer of 8 to 10

wherein $R^1$ represents a branched primary glycol residue having 4 to 8 carbon atoms

wherein n represents an integer of 4 to 8

  (VII)

wherein R² represents a divalent saturated aliphatic hydrocarbon group, saturated alicyclic hydrocarbon group or aromatic hydrocarbon group; said polyurethane having an inherent viscosity of 0.3 to 2.0 dl/g.

The present invention further provides a process for producing the above polyurethane, which comprises melt polymerizing a polyester diol having a number average molecular weight of 600 to 5,000 and consisting essentially of 1 to 3 members selected from structural units (I), (II) and (III) and structural units (IV) and (V), the sum of the molar fractions of structural units (I), (II), (III) and (IV) being substantially equal to the molar fraction of structural unit (V), the sum of the molar fractions of structural units (I) and (II) being at least 10% the sum of the molar fractions of structural units (I), (II), (III) and (IV), the sum of the molar fractions of structural units (II) and (III) being at least 10% the sum of the molar fractions of structural units (I), (II), (III) and (IV), the molar fraction of structural unit (IV) being at least 30% the sum of the molar fractions of structural units (I), (II), (III) and (IV), said polyester diol containing in at least 30% of its molecular ends the following structural unit (VI)

  (VI)

with a diisocyanate in the presence or absence of a chain extender.

The present invention still further provides the above-described polyester diol.

DETAILED DESCRIPTION OF PREFERRED EMBODIMENTS

The above-mentioned structural units (I), (II), (III), (IV), (V), (VI) and (VII) are described in detail.

Structural unit (I) is derived from 1,8-octanediol, 1,9-nonanediol or 1,10-decanediol. In view of heat resistance of resultant polyurethanes, structural unit (I) is preferably one derived from 1,9-nonanediol or 1,10-decanediol. Between the two, one derived from 1,9-nonanediol is more preferred by virtue of its capability to provide polyurethanes being excellent both in resistances to heat and cold.

Structural unit (II) is derived from 2-methyl-1,8-octanediol.

The branched primary glycol residue having 4 to 8 carbon atoms represented by R' in structural unit (III) is a divalent hydrocarbon group as derived from a branched primary glycol having 4 to 8 carbon atoms by removing its two hydroxyl groups. The term "primary glycol" herein means a glycol having two hydroxymethyl group. Structural unit (III) is derived from a branched primary glycol having 4 to carbon atoms, its side chain being preferably an alkyl group having 1 to 3 carbon atoms. Examples of said primary glycol are, among others, 3-methyl-1,5-pentanediol, neopentyl glycol, 2-methyl-1,3-propanediol and 4-methyl-1,7-heptanediol. From the viewpoint of the heat resistance of resultant polyurethanes, structural unit (III) is preferably a unit derived from a branched primary glycol having 6 to 8 carbon atoms, such as 3-methyl-1,5-pentanediol or 4-methyl-1,7-heptanediol.

Proper adjustment of molar fractions of structural units (II) and (III) with side chain can provide resultant polyurethanes with resistance to cold, flexibility and elastic recovery.

Structural unit (IV) is derived from 1,4-butanediol. If structural unit (IV) is replaced by a unit derived from an alkanediol other than 1,4-butanediol, such as ethylene glycol or 1,5-pentanediol, the resultant polyurethane will be insufficient in heat resistance and moldability, and in some cases even in resistances to cold and water, and will thus not be the high-Performance polyurethane of the present invention.

With respect to the question of amounts relationship among structural units (I), (II), (III) and (IV), it is necessary that the sum of the molar fractions of structural units (I) and (II) be at least 10%, preferably 15% the sum of the molar fractions of structural units (I), (II), (III) and (IV); the sum of the molar fractions of structural units (II) and (III) be at least 10% the sum of the molar fractions of structural units (I), (II), (III) and (IV); and the molar fraction of structural unit (IV) be at least 30%, preferably 30 to 80%, more preferably 30 to 75% the sum of the molar fractions of structural units (I), (II), (III) and (IV). If the amounts of structural units (I), (II), (III) and (IV) do not satisfy these relationships, polyurethanes aimed at in the present invention cannot be obtained.

Structural unit (V) is derived from a linear saturated aliphatic dicarboxylic acid, such as adipic acid, pimelic acid, suberic acid, azelaic acid or sebacic acid. From the viewpoint of the heat resistance of resultant polyurethanes, structural unit (V) is preferably one derived from adipic acid or azelaic acid. The molar fraction of structural unit (V) is substantially the same as the sum of the molar fractions of the above-mentioned structural units (I), (II), (III) and (IV).

Structural unit (VI) is derived from 1,4-butanediol.

In the formula of structural unit (VII), R² represents a divalent saturated aliphatic hydrocarbon group such as hexamethylene group; a divalent saturated alicyclic group such as isophoronediyl group or dicyclohexylmethane-4,4'-diyl group; or a divalent aromatic hydrocarbon group such as diphenylmethane-4,4'-diyl group, p-phenylene group, methylphenylene group, 1,5-naphthylene group or xylene-α, α'-diyl group. Structural unit (VII) is derived from an aliphatic, alicyclic or aromatic diisocyanate having two isocyanate groups in the molecule thereof represented by the general formula

wherein R² is as defined above. Examples of the diisocyanate are, among others, aromatic diisocyanates such as 4,4'-diphenylmethane diisocyanate, p-phenylene diisocyanate, tolylene diisocyanate and 1,5-naphthylene diisocyanate; aliphatic diisocyanates such as xylylene diisocyanate and hexamethylene diisocyanate; and alicyclic diisocyanates such as isophorone diisocyanate and 4,4'-dicyclohexylmethane diisocyanate.

The polyurethane of the present invention has a main chain which consists, as described before, essentially of a specific polyester diol unit and structural unit (VII) but may, as later described herein, contain a small amount of a structural unit derived from a chain extender. This structural unit derived from a chain extender is generally contained in an amount of not more than 20% by weight based on the weight of polyurethane. With a view to obtaining polyurethanes having high thermoplasticity or those extremely suitable for materials for synthetic leathers, artificial leathers, elastic fiber and the like, the structural unit derived from a chain extender is preferably contained in an amount of 5 to 10% by weight based on the weight of polyurethane.

The polyurethane of the present invention is, as described before, produced by melt polymerization of a specific polyester diol and a diisocyanate giving structural unit (VII) in the presence or absence of a chain extender. Known polymerization conditions for urethane formation can apply here, but it is preferred to employ a polymerization temperature of 200° to 240° C. A polymerization temperature of 200° C. and above gives polyurethanes having a good molding processability, While that of 240° C. or below can give polyurethanes having still improved heat resistance. The polymerization is preferably conducted by continuous melt polymerization using, in particular, a multi-screw extruder.

Known chain extenders, i.e. low molecular weight compounds having at least two hydrogen atoms reactable with isocyanate and having a molecular weight of not more than 400, used in conventional polyurethane production, can also be used here. Examples of the chain extender are diols such as ethylene glycol, propylene glycol, 1,4-butanediol, neo-pentyl glycol, 1,6-hexanediol, 3-methyl-1,5-pentanediol, 1-4-cyclohexanediol, 1,4-bis($\beta$-hydroxyethoxy)benzene, bis($\beta$-hydroxyethyl) terephthalate and xylylene glycol; diamines such as ethylenediamine, propylenediamine, xylylenediamine, isophoronediamine, piperazine, phenylenediamine and tolylenediamine; hydrazine; and hydrazides such as adipic acid dihydrazide and isophthalic acid dihydrazide. Among the above compounds, 1,4-butanediol or 1,4-bis($\alpha$-hydroxyethoxy)benzene is most preferably used. These compounds may be used singly or in combination of two or more.

The polyester diols used for the preparation of the polyurethane of the present invention consists, as described above, essentially of 1 to 3 members selected from structural units (I), (II) and (III), and structural units (IV) and (V), and at least 30% of its molecular ends are structural unit (VI). With polyester diols in which less than 30% of its molecular ends are structural unit (VI), it is difficult to obtain polyurethanes having high heat resistance. The starting material polyester diol is produced from specified amounts of at least one diol that can give 1 to 3 members selected from the above-described structural units (I), (II) and (III), 1,4-butanediol that gives structural units (IV) and (VI) and an aliphatic dicarboxylic acid or its ester that can give structural unit (V) by known transesterification or direct esterification reaction, followed by melt polycondensation, Which is employed for producing conventional polyesters such as polyethylene terephthalate and polybutylene terephthalate. The starting material polyester diol has a number average molecular weight as determined from hydroxyl group value and acid value of 600 to 5,000. If the number average molecular weight is less than 600, the resultant polyurethane will be poor in low temperature characteristics. If the number average molecular weight exceeds 5,000, the resultant polyurethane will have low mechanical properties. From the viewpoint of both low temperature characteristics and mechanical properties, the molecular weight is preferably 800 to 4,000.

The polyurethane thus produced has an inherent viscosity as measured on 0.5 g/100 ml specimen solution in dimethylformamide at 30° C. of 0.3 to 2.0 dl/g, preferably 0.5 to 1.5 dl/g.

The polyurethane of the present invention is excellent in all of heat resistance, injection moldability, water resistance, resistance to cold and mechanical properties, as well as in resistance to oil and flexing resistance.

Since the polyurethane of the present invention is excellent in molding processability including injection moldability and in heat resistance, it can readily be molded using a conventional injection molding machine, extrusion molding machine, blow molding machine or the like. The polyurethane of the present invention is, because of its excellent resistances to heat, water and cold and high mechanical properties, used as materials for sheet, film, roll, gear, solid tire, belting, hose, tube, packing, vibrationproof materials, shoe sole, sports shoes and various laminates, as well as for machine parts, automobile parts, sports goods, elastic fiber and the like. The polyurethane of the present invention is also used, being dissolved in solvents, for artificial leather, textile finish, adhesive, binder, paint and the like. Further the polyurethane of the present invention can incorporate, as required, a known filler, stabilizer, color, reinforcing agent and the like.

Having generally described this invention, a further understanding can be obtained by reference to certain specific examples which are provided herein for the purpose of illustration only and are not intended to be limitative of the scope of this invention unless otherwise specified.

Hereinbelow in Examples and Comparative Examples, the number average molecular weight of polyester diols and the inherent viscosity of polyurethanes were determined and the identification and quantitative determination of terminal structure of polyester diols were conducted, according to the methods given below. The heat resistance, injection moldability, resistances to water and cold, and mechanical properties of polyurethanes were evaluated according to the methods also given below. The "content of hard segment" of polyurethane herein means the ratio by weight of segments derived from diisocyanate and chain extender to the weight of the polyurethane.

(1) Number average molecular Weight: calculated from the hydroxyl group value and acid value of specimen polyester diol.

(2) Identification and quantitative determination of terminal structure: conducted on specimen polyester diol using a 500 MHz proton NMR (JNM-GX500, made by JEOL Ltd.).

(3) Inherent viscosity Specimen polyurethane is dissolved in dimethylformamide to a concentration of 0.5 g/100 ml, and the solution is tested for viscosity at 30° C.

(4) Heat resistance: Evaluated by the Vicat softening temperature (° C.) of a specimen determined according to Japanese Industrial Standard JIS K7206-1982 "Testing Method for Vicat Softening Temperature of Thermoplastics". Vicat softening temperature is the temperature at which a flatended needle of 1-mm$^2$ circular cross section will penetrate a specimen to a depth of 1 mm under a load of 1.00 to 1.05 kgf using a rate of temperature rise of 50±5° C./hr.

(5) Injection moldability: Evaluated by cycle time, i.e. sum of injecting time and cooling time, and by generation of sink mark. Cycle time was indicated by the following ratings. +++: not more than 50 sec; ++: 60 to 80 sec and +: at least 100 sec. Generation of sink mark is indicated by the following ratings. + + + +: no sink mark; + + +: small sink mark, + +: medium-size sink mark and +: large sink mark.

(6) Water resistance: A specimen polyurethane film having a thickness of 100μm is allowed to stand at 70° C. and 95% RH for 28 days. Tensile strength is determined before and after the Period and retention of the tensile strength is used for the evaluation.

(7) Resistance to cold: A specimen polyurethane film having a thickness of 100μm is tested with a dynamic viscoelasticity tester (DVE RHEOSPECTLER, made by Rheology Co.). The temperature, Tα, at which the dynamic loss elastic modulus, E", reaches its Peak at a frequency of 11 Hz when the temperature of the specimen is raised, is determined and used for the evaluation.

(8) Mechanical properties: Japanese Industrial Standard JIS K7311-1987 "Testing Methods for Thermoplastic Polyurethane Elastomers" is applied. A specimen polyurethane film having a thickness of 100μm is punched to give dumbbell specimens with their parallel part having a width and a length of 5 mm and 20 mm, respectively. The specimens are tested for breaking load and elongation at an extension rate of 30 cm/min.

EXAMPLE 1

Preparation of polyester diol

A reaction vessel was charged with 1,600 g of a mixture of 2-methyl-1,8-octanediol, 1,9-nonanediol and 1,4-butanediol (molar ratio=17:33:50) and 1,460 g of adipic acid (molar ratio between the diols and the adipic acid=1.3:1.0). Esterification was conducted at about 220° C. and under atmospheric pressure with nitrogen gas streaming into the system, while water formed was being distilled off. When the acid value of the resultant polyester reached 0.3 or below, the vaccum degree was gradually increased with a vacuum pump to terminate the reaction. The thus obtained polyester had a hydroxyl group value of 56, an acid value of 0.20 and a number average molecular weight of 2,000. 48% of the molecular ends of the polyester were those derived from 1,4-butanediol.

Examples 2 through 12 and Comparative Examples 1 through 12 Preparation of polyester diols The procedure of Example 1 was followed using dicarboxylic acids and diols that gave the dicarboxylic acid components shown in Table 1 and the diol components shown in Table 2, respectively, in amounts as shown, to effect esterification to obtain corresponding polyester diols. Reaction times were adjusted such that the resultant polyester diols would have intended molecular weights.

Of the polyester diols obtained in Examples 1 through and Comparative Examples 1 through 12, Tables 1, 2 and 3 show, respectively, the dicarboxylic acid components and their ratios, diol components and their ratios, number average molecular weights and contents of structural unit (VI) in total molecular ends. In Tables 1 and 2, dicarboxylic acid components and diol components are shown by the following codes.

AD : adipic acid
AZA: azelaic acid
SBA: sebacic acid
DA : 1,10-decanedicarboxylic acid
OD : 1,8-octanediol
ND : 1,9-nonanediol
DD : 1,10-decanediol
MOD: 2-methyl-1,8-octanediol
MPD: 3-methyl-1,5-Pentanediol
MPG: 2-methyl-1,3-propanediol
BD : 1,4-butanediol
HD : 1,6-hexanediol
PD : 1,5-Pentanediol
EG : ethylene glycol

TABLE 1

| Example or Comparative Example | | Polyester diol | Dicarboxylic acid component (mol %) | | | |
|---|---|---|---|---|---|---|
| | | | AD | AZA | SBA | DA |
| Example | 1 | A | 100 | | | |
| " | 2 | B | 100 | | | |
| " | 3 | C | 100 | | | |
| " | 4 | D | 100 | | | |
| " | 5 | E | 50 | | 50 | |
| " | 6 | F | 100 | | | |
| " | 7 | G | | 100 | | |
| " | 8 | H | 100 | | | |
| " | 9 | I | 60 | 40 | | |
| " | 10 | J | 35 | 35 | 30 | |
| " | 11 | K | 80 | 20 | | |
| Comparative | | | | | | |
| Example | 1 | L | 100 | | | |
| " | 2 | M | 100 | | | |
| " | 3 | N | 100 | | | |
| " | 4 | O | 100 | | | |
| " | 5 | P | 100 | | | |
| " | 6 | Q | | | | 100 |
| " | 7 | R | 100 | | | |
| " | 8 | S | 100 | | | |
| " | 9 | T | 100 | | | |
| Example | 12 | U | 100 | | | |
| Comparative | | | | | | |
| Example | 10 | V | 60 | 40 | | |
| " | 11 | W | 80 | 20 | | |
| " | 12 | X | 80 | 20 | | |

TABLE 2

| Example or Comparative Example | | Polyester diol | Diol component (mol %) | | | | | | | | | |
|---|---|---|---|---|---|---|---|---|---|---|---|---|
| | | | OD | ND | DD | MOD | MPD | MPG | BD | HD | PD | EG |
| Example | 1 | A | | 33 | | 17 | | | 50 | | | |
| " | 2 | B | | 44 | | 22 | | | 34 | | | |
| " | 3 | C | | 17 | | 13 | | | 70 | | | |
| " | 4 | D | | 10 | | 15 | | | 75 | | | |
| " | 5 | E | | 20 | | 10 | 10 | | 60 | | | |
| " | 6 | F | 25 | | | 15 | | | 60 | | | |
| " | 7 | G | | 30 | | 15 | | | 55 | | | |
| " | 8 | H | | 50 | | | 10 | | 40 | | | |
| " | 9 | I | | 30 | | | | 20 | 50 | | | |
| " | 10 | J | | 20 | | | | 15 | 65 | | | |
| " | 11 | K | | | | 25 | | | 75 | | | |
| Comparative | | | | | | | | | | | | |
| Example | 1 | L | | 65 | | 35 | | | | | | |
| " | 2 | M | | | | | | | 100 | | | |

TABLE 2-continued

| Example or Comparative Example | | Polyester diol | Diol component (mol %) | | | | | | | | | |
|---|---|---|---|---|---|---|---|---|---|---|---|---|
| | | | OD | ND | DD | MOD | MPD | MPG | BD | HD | PD | EG |
| " | 3 | N | | 56 | | 28 | | | 16 | | | |
| " | 4 | O | | 4 | | 2 | | | 94 | | | |
| " | 5 | P | | | | | 15 | | 55 | 30 | | |
| " | 6 | Q | | | 40 | 10 | | | 50 | | | |
| " | 7 | R | 50 | | | | | | 50 | | | |
| " | 8 | S | | 33 | | 17 | | | 50 | | | |
| " | 9 | T | | 33 | | 17 | | | 50 | | | |
| Example | 12 | U | | 20 | | 20 | | | 60 | | | |
| Comparative | | | | | | | | | | | | |
| Example | 10 | V | | 56 | | | 37 | | 7 | | | |
| " | 11 | W | | | | 25 | | | | | 75 | |
| " | 12 | X | | | | 25 | | | | | | 75 |

TABLE 3

| Example or Comparative Example | | Polyester diol | Number average molecular weight | Content of structural unit (VI) in total terminal groups (%) |
|---|---|---|---|---|
| Example | 1 | A | 2,000 | 48 |
| " | 2 | B | 2,000 | 33 |
| " | 3 | C | 2,000 | 67 |
| " | 4 | D | 2,000 | 72 |
| " | 5 | E | 2,000 | 58 |
| " | 6 | F | 2,000 | 58 |
| " | 7 | G | 2,000 | 52 |
| " | 8 | H | 2,000 | 38 |
| " | 9 | I | 2,000 | 49 |
| " | 10 | J | 2,000 | 64 |
| " | 11 | K | 2,000 | 72 |
| Comparative | | | | |
| Example | 1 | L | 2,000 | 0 |
| " | 2 | M | 2,000 | 100 |
| " | 3 | N | 2,000 | 14 |
| " | 4 | O | 2,000 | 92 |
| " | 5 | P | 2,000 | 55 |
| " | 6 | Q | 2,000 | 46 |
| " | 7 | R | 2,000 | 49 |
| " | 8 | S | 500 | 49 |
| " | 9 | T | 5,500 | 47 |
| Example | 12 | U | 3,000 | 58 |
| Comparative | | | | |
| Example | 10 | V | 2,000 | 6 |
| " | 11 | W | 2,000 | 0 |
| " | 12 | X | 2,000 | 0 |

EXAMPLE 13

Preparation of polyurethane and its evaluation

Continuous melt polymerization was conducted by continuously feeding through a metering pump to a samedirection twin-screw extruder a mixture heated at 30° C. of a polyester diol(A) and 1,4-butanediol (hereinafter referred to as BD) in a molar ratio of 1:4, and 4,4'-diphenylmethane diisocyanate (hereinafter referred to as MDI) melted by heating at 50° C. in amounts to make the molar ratio of polyester diol(A)/MDI/BD 1/5/4. The polymerization temperature, i.e. temperature of the intermediate zone of the twin-screw extruder, which was the highest among those of three zones of front, intermediate and rear, was set to 220° C. The polyurethane formed was extruded continuously into water to form a strand, and the strand was formed into pellets through a pelletizer. The pellets thus obtained were formed with a heat press into a sheet and a film. These sheet and film were evaluated for heat resistance, water resistance, resistance to cold and mechanical properties. The pellets were also evaluated for injection moldability. The results are shown in Tables 5 and 6.

The polyurethane obtained were excellent in all of heat resistance, injection moldability, water resistance, resistance to cold and mechanical properties. moldability.

EXAMPLES 14 THROUGH 23 AND COMPARATIVE EXAMPLES 13 THROUGH 23

Preparation of polyurethanes and their evaluation

Example 13 was repeated except for using each of polyester diols as shown in Table 4 instead of polyester diol(A) and feeding the polyester diol, MDI and BD in the corresponding molar ratio shown in Table 4, to conduct reaction and subsequent operations, to obtain pellets of a polyurethane and form the Pellets into a sheet and a film. The sheets and films thus obtained were evaluated for various characteristics in the same manner as in Example 13. The results are shown in Tables 5 and 6.

The polyurethanes obtained in the Examples were excellent in all of heat resistance, injection moldability, water resistance, resistance to cold and mechanical properties.

Any of the polyurethanes obtained in the Comparative Examples was not good in all of heat resistance, injection moldability, water resistance, resistance to cold and mechanical properties.

EXAMPLE 24

Preparation of polyurethane and its evaluation

Example 13 was repeated except for feeding polyester diol(A), MDI and BD in molar ratio of 1:5.5:4.5, to conduct polymerization and subsequent operations, to obtain pellets of a polyurethane and form the pellets into a sheet and a film. The sheet and film were evaluated in the same manner as in Example 13. The polyurethane had a hard segment content of 47%. The results are shown in Tables 5 and 6.

The polyurethane obtained was excellent in all of heat resistance, injection moldability, water resistance, resistance to cold and mechanical properties.

COMPARATIVE EXAMPLE 23

Preparation of polyurethane and its evaluation

Example 13 was repeated except for using polyester diol(S) instead of polyester diol(A), and feeding the polyester diol(S), MDI and BD in molar ratio of 1:1.6:0.6 so that the resultant polyurethane would contain 47% of hard segment, to conduct polymerization and succeeding operations, to obtain pellets of a polyurethane and form the pellets into a sheet and a film. The sheet and film were evaluated in the same manner as in Example 13. The results are shown in Tables 5 and 6.

The polyurethane obtained was poor in heat resistance, injection moldability and resistance to cold.

COMPARATIVE EXAMPLE 24

Preparation of polyurethane and its evaluation

Example 13 was repeated except for using polyester diol(T) instead of polyester diol(A), and feeding the polyester diol(T), MDI and BD in molar ratio of 1:7.8:6.8 so that the resultant polyurethane would contain 32% of hard segment, to conduct polymerization and succeeding operations, to obtain Pellets of a polyurethane and form the pellets into a sheet and a film. The sheet and film were evaluated in the same manner as in Example 13. The results are shown in Tables 5 and 6.

The polyurethane obtained was poor in heat resistance, injection moldability and resistance to cold.

EXAMPLE 25

Preparation of polyurethane and its evaluation

Example 13 was repeated except for using polyester diol(U) instead of polyester diol(A), and feeding the polyester diol(U), MDI and BD in molar ratio of 1:6.5:5.5, to conduct polymerization and succeeding operations, to obtain pellets of a polyurethane and form the pellets into a sheet and a film. The sheet and film were evaluated in the same manner as in Example 13. The polyurethane had a hard segment content of 42%. The results are shown in Tables 5 and 6.

The polyurethane obtained was excellent in all of heat resistance, injection moldability, water resistance, resistance to cold and mechanical properties.

EXAMPLE 26

Preparation of polyurethane and its evaluation

Example 13 was repeated except for using a chain extender of a mixture of BD with 1,4-bis(β-hydroxyethoxy)-benzene in a molar ratio of 2:1, instead of BD alone, to conduct polymerization and succeeding operations, to obtain pellets of a polyurethane and form the Pellets into a sheet and a film. The sheet and film were evaluated in the same manner as in Example 13. The results are shown in Tables 5 and 6.

The polyurethane obtained was excellent in all of heat resistance, injection moldability, water resistance, resistance to cold and mechanical properties.

Obviously, numerous modifications and variations of the present invention are possible in light of the above teachings. It is therefore to be understood that within the scope of the appended claims, the invention may be practiced otherwise than as specifically described herein.

TABLE 4

| Example or Comparative Example | Polyester diol | Polyurethane composition polyester diol:MDI:chain extender | Content of hard segment (%) |
| --- | --- | --- | --- |
| " 13 | A | 1:5:4 | 45 |
| " 14 | B | 1:5:4 | 45 |
| " 15 | C | 1:5:4 | 45 |
| " 16 | D | 1:5:4 | 45 |
| " 17 | E | 1:5:4 | 45 |
| " 18 | F | 1:5:4 | 45 |
| " 19 | G | 1:5:4 | 45 |
| " 20 | H | 1:5:4 | 45 |
| " 21 | I | 1:5:4 | 45 |
| " 22 | J | 1:5:4 | 45 |
| " 23 | K | 1:5:4 | 45 |
| Comparative | | | |
| Example 13 | L | 1:5:4 | 45 |
| " 14 | M | 1:5:4 | 45 |
| " 15 | N | 1:5:4 | 45 |
| " 16 | O | 1:5:4 | 45 |
| " 17 | P | 1:5:4 | 45 |
| " 18 | Q | 1:5:4 | 45 |
| " 19 | R | 1:5:4 | 45 |
| " 20 | V | 1:5:4 | 45 |
| " 21 | W | 1:5:4 | 45 |
| " 22 | X | 1:5:4 | 45 |
| Example 24 | A | 1:5.5:4.5 | 47 |
| Comparative | | | |
| Example 23 | S | 1:1.6:0.6 | 47 |
| " 24 | T | 1:7.8:6.8 | 32 |
| Example 25 | U | 1:6.5:5.5 | 42 |
| " 26 | A | 1:5:4 | 46 |

TABLE 5

| Example or Comparative Example | Inherent viscosity (dl/g) | Heat resistance Vicat softening temperature (°C.) | Injection moldability Cycle time | Injection moldability Sink mark |
| --- | --- | --- | --- | --- |
| Example 13 | 1.02 | 124 | +++ | ++++ |
| " 14 | 1.19 | 120 | +++ | ++++ |
| " 15 | 0.98 | 122 | +++ | ++++ |
| " 16 | 1.05 | 118 | +++ | ++++ |
| " 17 | 1.21 | 123 | +++ | ++++ |
| " 18 | 1.07 | 118 | +++ | ++++ |
| " 19 | 1.14 | 120 | +++ | ++++ |
| " 20 | 1.97 | 119 | +++ | ++++ |
| " 21 | 1.00 | 119 | +++ | ++++ |
| " 22 | 0.98 | 119 | +++ | ++++ |
| " 23 | 1.12 | 121 | +++ | ++++ |
| Comparative | | | | |
| Example 13 | 0.99 | 110 | +++ | ++++ |
| " 14 | 1.14 | 95 | ++ | +++ |
| " 15 | 1.07 | 105 | +++ | ++++ |
| " 16 | 1.04 | 96 | ++ | +++ |

TABLE 5-continued

| Example or Comparative Example | | Inherent viscosity (dl/g) | Heat resistance Vicat softening temperature (°C.) | Injection moldability | |
|---|---|---|---|---|---|
| | | | | Cycle time | Sink mark |
| " | 17 | 1.07 | 97 | ++ | ++ |
| " | 18 | 1.09 | 94 | +++ | ++++ |
| " | 19 | 1.13 | 120 | +++ | ++++ |
| " | 20 | 1.00 | 107 | +++ | ++++ |
| " | 21 | 1.01 | 87 | + | + |
| " | 22 | 0.99 | 90 | + | + |
| Example | 24 | 1.08 | 130 | +++ | ++++ |
| Comparative Example | 23 | 1.12 | 60 | + | + |
| " | 24 | 0.99 | 98 | +++ | ++++ |
| Example | 25 | 0.97 | 125 | +++ | ++++ |
| " | 26 | 1.04 | 128 | +++ | ++++ |

TABLE 6

| Example or Comparative Example | | Water resistance Retension of tensile strength (°C.) | Resistance to cold $T_\alpha$ (°C.) | Mechanical properties | |
|---|---|---|---|---|---|
| | | | | Breaking load (kg/cm$^2$) | Elongation at break (%) |
| Example | 13 | 80 | −40 | 700 | 470 |
| " | 14 | 83 | −42 | 700 | 480 |
| " | 15 | 75 | −38 | 680 | 460 |
| " | 16 | 70 | −36 | 670 | 455 |
| " | 17 | 84 | −41 | 710 | 500 |
| " | 18 | 78 | −37 | 670 | 450 |
| " | 19 | 87 | −43 | 720 | 510 |
| " | 20 | 75 | −38 | 680 | 440 |
| " | 21 | 82 | −38 | 690 | 450 |
| " | 22 | 77 | −38 | 685 | 445 |
| " | 23 | 84 | −40 | 710 | 500 |
| Comparative Example | 13 | 85 | −40 | 670 | 480 |
| " | 14 | 24 | −33 | 650 | 430 |
| " | 15 | 80 | −38 | 665 | 470 |
| " | 16 | 40 | −33 | 650 | 440 |
| " | 17 | 60 | −34 | 650 | 420 |
| " | 18 | 75 | −20 | 620 | 400 |
| " | 19 | 79 | −15 | 660 | 420 |
| " | 20 | 84 | −40 | 650 | 480 |
| " | 21 | 10 | −15 | 540 | 620 |
| " | 22 | 5 | −15 | 580 | 520 |
| Example | 24 | 80 | −39 | 720 | 460 |
| Comparative Example | 23 | 87 | 10 | 750 | 200 |
| " | 24 | 55 | −45 | 300 | 420 |
| Example | 25 | 82 | −43 | 670 | 520 |
| " | 26 | 83 | −37 | 730 | 420 |

What is claimed is:

1. A polyurethane having a main chain consisting essentially of polyester diol units and units of structure

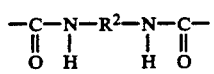 (VII)

wherein R$^2$ is a divalent saturated aliphatic hydrocarbon group, a divalent saturated alicyclic hydrocarbon group or a divalent aromatic hydrocarbon group, the polyurethane prepared by reacting a diisocyanate compound with a polyester diol consisting essentially of substantially equimolar amounts of units of the formula (V):

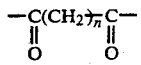 (V)

wherein n is an integer of 4 to 8, and diol units derived from a combination of diol reactants of the formulae:

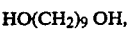 (I)

 (II)

HOR$^1$OH, (III)

wherein R$^1$ is a branched primary glycol residue of 4 to 8 carbon atoms, and

HO(CH$_2$)$_4$OH (IV)

in which 1,4-butanediol (IV) is combined with at least one diol of formula (I), (II) or (III) and where the mole fractions of diol compounds in the combination of diol compounds reacted with a component wherefrom the unit (V) is derived are as follows:

A) the mole fraction of diols (I)+(II) is at least 10% of the sum of all diols (I)+(II)+(III)+(IV) in the diol combination;
B) the mole fraction of diols (II)+(III) is at least 10% of the sum of all diols (I)+(II)+(III)+(IV) in the diol combination; and
C) the mole fraction of diol (IV) is at least 30% of the sum of all diols (I)+(II)+(III)+(IV) in the diol combination; said polyurethane having an inherent viscosity of 0.3 to 2.0 dl/g.

2. The polyurethane of claim 1, which contains a structural unit from diol (III) which is a branched primary glycol of 6 to 8 carbon atoms.

3. The polyurethane of claim 1, wherein the mole fraction of diols (I)+(II) is at least 15% of the sum of all diols (I)+(II)+(III)+(IV) in the diol combination.

4. The polyurethane of claim 1, wherein the mole fraction of diol (IV) is 30 to 80% of the sum of all diols (I)+(II)+(III)+(IV) in the diol combination.

5. The polyurethane of claim 4, wherein the mole fraction of diol (IV) is 30 to 75% of the sum of all diols (I)+(II)+(III)+(IV) in the diol combination.

6. The polyurethane of claim 4, wherein the main chain of the polyurethane consists of polyester diol units, units of structure (VII) and units of a structure derived from a chain extender.

7. A process for producing a polyurethane having an inherent viscosity of 0.3 to 2.0 dl/g and having a main chain consisting essentially of polyester diol units and units of structure

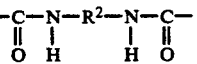 (VII)

wherein R$^2$ is a divalent saturated aliphatic hydrocarbon group, a divalent saturated alicyclic hydrocarbon group or a divalent aromatic hydrocarbon group, the polyurethane prepared by melt polymerizing a diisocyanate which conforms to structure (VII) in the presence or absence of a chain extender with a polyester diol having a number average molecular weight of 600 to 5,000 and in which at least 30% of its molecular ends has the structural unit (VI): —O—(CH$_2$)$_4$OH and consisting essentially of substantially equimolar amounts of units of the formula $$-\underset{O}{\underset{\|}{C}}(CH_2)_n\underset{O}{\underset{\|}{C}}- \qquad (V)$$

wherein n is an integer of 4 to 8, and diol units derived from a combination of diol reactants of the formulae:

HO(CH$_2$)$_9$OH, (I)

CH$_3$
|
HOCH$_2$CH(CH$_2$)$_6$OH, (II)

HOR$^1$OH, (III)

wherein R$^1$ is a branched primary glycol residue of 4 to 8 carbon atoms, and

HO(CH$_2$)$_4$OH (IV)

in which 1,4-butanediol (IV) is combined with at least one diol of formula (I), (II) or (III) and where the mole fractions of diol compounds in the combination of diol compounds reacted with a component wherefrom the unit (V) is derived are as follows:

A) the mole fraction of diols (I)+(II) is at least 10% of the sum of all diols (I)+(II)+(III)+(IV) in the diol combination;

B) the mole fraction of diols (II)+(III) is at least 10% of the sum of all diols (I)+(II)+(III)+(IV) in the diol combination; and C) the mole fraction of diol (IV) is at least 30% of the sum of all diols (I)+(II)+(III)+(IV) in the diol combination.

8. A polyester diol having a number average molecular weight of 600 to 5,000 and having at least 30% of its molecular ends of the structural unit (VI): —O—(CH$_2$)$_4$OH and consisting essentially of substantially equimolar amounts of units of the formula $$-\underset{O}{\underset{\|}{C}}(CH_2)_n\underset{O}{\underset{\|}{C}}- \qquad (V)$$

wherein n is an integer of 4 to 8, and diol units derived from a combination of diol reactants of the formulae:

HO(CH$_2$)$_9$OH (I)

CH$_3$
|
HOCH$_2$CH(CH$_2$)$_6$OH, (II)

HOR$^1$OH, (III)

wherein R$^1$ is a branched primary glycol residue of 4 to 8 carbon atoms, and

HO(CH$_2$)$_4$OH (IV)

in which 1,4-butanediol (IV) is combined with at least one diol of formula (I), (II) or (III) and where the mole fractions of diol compounds in the combination of diol compounds reacted with a component wherefrom the unit (IV) is derived are as follows:

A) the mole fraction of diols (I)+(II) is at least 10% of the sum of all diols (I)+(II)+(III)+(IV) in the diol combination;

B) the mole fraction of diols (II)+(III) is at least 10% of the sum of all diols (I)+(II)+(III)+(IV) in the diol combination; and C) the mole fraction of diol (IV) is at least 30% of the sum of all diols (I)+(II)+(III)+(IV) in the diol combination.

9. The polyester diol of claim 8 which contains a structural unit from diol (III) which is a branched primary glycol having 6 to 8 carbon atoms.

10. The polyester diol of claim 8, wherein the mole fraction of diols (I)+(II) is at least 15% of the sum of all diols (I)+(II)+(III)+(IV) in the diol combination.

11. The polyester diol of claim 8, wherein the mole fraction of diol (IV) is 30 to 80% of the sum of all diols (I) +(II)+(III)+(IV) in the diol combination.

12. The polyester diol of claim 11, wherein the mole fraction of diol (IV) is 30 to 75% of the sum of all diols (I) +(II)+(III)+(IV) in the diol combination.

13. The polyester diol of claim 8 which has a number average molecular weight of 800 to 4,000.

* * * * *